United States Patent [19]

Eberle

[11] 4,246,927
[45] Jan. 27, 1981

[54] BATTERY FORMATION APPARATUS

[75] Inventor: Kelly L. Eberle, Reading, Pa.

[73] Assignee: General Battery Corporation, Reading, Pa.

[21] Appl. No.: 46,625

[22] Filed: Jun. 8, 1979

[51] Int. Cl.³ ............................................. F17D 1/00
[52] U.S. Cl. .................................. 137/269; 137/577; 137/571; 137/590
[58] Field of Search ............... 137/269, 270, 271, 590, 137/577, 571

[56] References Cited

U.S. PATENT DOCUMENTS

| 1,054,533 | 2/1913 | Greiner | 137/590 |
| 1,102,971 | 7/1914 | Williams | 137/590 X |
| 2,321,176 | 6/1943 | Block | 137/590 X |
| 3,326,264 | 6/1967 | Howard | 137/590 X |
| 4,084,796 | 4/1978 | Krehbiel | 137/577 X |

Primary Examiner—Alan Cohan
Attorney, Agent, or Firm—Benasutti Associates, Ltd.

[57] ABSTRACT

An improved battery formation apparatus wherein a specially designed overflow/drain plug is provided for directing the flow of fluid out of a water tub used to control the temperature of batteries during the formation thereof. The plug is a combination of a hollow plug member and a collar member fitted around this plug member. The plug member is designed to fit inside the drain opening and extend upward therefrom to control the liquid level in the container, and furthermore, the plug is designed to fit around the bottom of the drain opening to facilitate draining of the fluid from the opening. The plug member has an elongated slot therethrough, and the collar means is slidably fitted around the plug member to adjustably determine the height along the plug member which the fluid must reach before it is drained through the elongated slot.

11 Claims, 3 Drawing Figures

BATTERY FORMATION APPARATUS

BACKGROUND OF THE INVENTION

The present invention relates to a device for use with drain openings in cascading water tanks of a battery formation apparatus, and in particular, the present invention relates to a device which can be used as both a drain extension and an overflow outlet in these water tanks.

One of the classic problems in the battery industry is controlling temperature and time of battery formation. When electrolyte is first added to an unfilled, unformed battery and interacts with the paste on the plates of the element assembly within the battery, a great deal of heat is generated; this heat is referred to as the heat of neutralization. Heat further continues to be generated by the battery during the formation and charging process while high current flow is passed through the batteries. It is unecomonical to purchase and maintain sufficient equipment to form batteries at a current low enough to prevent the batteries from heating.

Various apparatuses have been devised to cool batteries during the neutralization, formation, and charging process in order to avoid internal overheating of the batteries which, if not properly controlled, will result in destruction of the battery. The old problem of dissipating heat which is generated during the formation of a battery is now further aggravated by the widespread use of plastic battery cases throughout the automotive battery industry. Unlike the rubber, composition, or glass cases previously used, plastic cases generally tend to have a low heat transfer coefficient which tends to insulate the interior of the battery, retain generated heat thereinside, and make it particularly susceptible to overheating.

Several approaches have been suggested to overcome this problem of maintaining proper battery temperature during formation. One approach which has been used is to spray the batteries with water or other cooling fluid. This approach, however, is not especially successful since the water spray does not have a sufficiently efficient heat conducting capacity. Chilled electrolyte has also been used as an approach for reducing the heat of neutralization, but this is an expensive technique, and while it reduces the high initial peak, the possibility of high heat developing during formation exists as well as the possibility of having a delayed thermal runaway.

One of the more successful solutions to the problem of heat generation in batteries during formation has been the development of the water bath technique in which the batteries are contained in tanks wherein cooling water is circulated during the battery neutralization, formation, and charging process. In general, a method and apparatus have been developed to form a maximum amount of floor space and still maintain appropriate temperatures by providing stackable, water-filled tubs for holding the batteries during formation. In one mode of operating the stacked tubs, water is continuously fed into the uppermost tub and from there allowed to overflow or cascade to the next lower tub and so on. Another approach to providing the tubs with water is to fit each tub with a drain through which the water in the tub may be eliminated while cooling water is continuously added to the tub. The drain may lead to the next lower tub in the stack of tubs so that the cooling water will pass downward through the tubs or it may simply lead away from the tubs entirely.

At least two significant problems arise when the drain structure is provided to allow the water to pass to the next lower tub. Oftentimes the drains are simply openings which project only slightly beneath the bottom of the upper tub, and the water must fall uncontained through the space between the bottom of the upper tub and the surface of the water in the lower tub. Consequently, the falling water splashes as it hits the water in the tub, and this can lead to undesireable splashing onto the terminals of the batteries which are being formed. Furthermore, when these drains are provided in the tubs, there is often no consideration given to preventing the water level from raising too high around the batteries being formed or to simply preventing the water from reaching a stage where it overflows from the tub.

BRIEF SUMMARY OF THE INVENTION

With these background considerations and problems in mind, it is a primary objective of the present invention to provide an improved battery formation apparatus which uses a device that can be easily affixed to a drain in a water tub and which will guide and contain the flow of water from the upper drain toward the tub therebeneath, so that splashing and unrestricted dispersion of the water are minimized or eliminated.

Furthermore, it is also an objective of this invention to provide a device which can be inserted into the drain opening in a tub of a battery formation water bath which will provide a means for adjustably controlling the water level in the tub and thereby preventing the tub from over flowing.

These objectives are achieved by the present invention in which a specially constructed drain/overflow plug is provided. The plug can fit around and extend downward from the bottom of the drain opening in the container to facilitate the draining of fluid from the container, and the plug may also be inserted into the top of the drain opening and extend there above the control the height of the liquid in the container. The plug is hollow and is expanded at its top to fit around the bottom of the drain and is tapered at its bottom to fit into the top of the drain. An elongated slot is provided through the side of the plug so that the liquid can flow therethrough into the hollow plug, and a slidable collar fits around the plug which can be moved into position around the slot in order to determine how high the liquid must be in the container before it empties into the hollow plug through the slot. This plug is especially useful in a cooling tank in which cooling fluid and batteries are contained during the formation of the batteries since it may be easily fitted into the drain in the tank to control the liquid level and may be fitted around the bottom of the drain to aid in directing the flow of fluid from the tank.

BRIEF DESCRIPTION OF THE DRAWINGS

The above presented and further objectives of the present invention will become more apparent from the following detailed description taken in conjunction with the formal drawings, wherein.

DETAILED DESCRIPTION OF THE INVENTION

Figure 1:
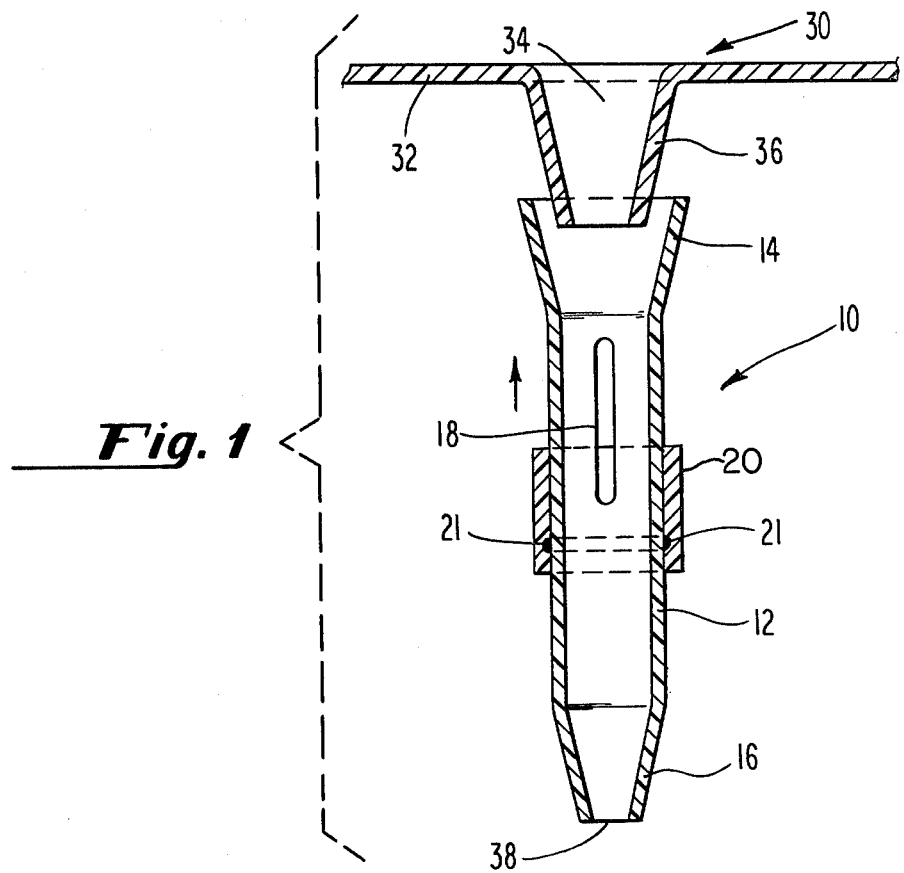
FIG. 1 is a section view of the drain/overflow plug of the present invention.

Although specific forms of the invention have been selected for illustration in the drawings, and the following description is drawn in specific terms for the purpose of describing these forms of the invention, this description is not intended to limit the scope of the invention which is defined in the appended claims.

The basic structure of the plug for use with a battery formation apparatus is best represented in FIG. 1. The plug itself, generally noted as 10, is preferably of circular and somewhat cylindrical shape. There is a hollow main body portion 12, which is substantially cylindrical, and a flared top portion 14 extends upwardly from the main body portion. At the lower end the main body portion 12 is a bottom portion 16 with a gradually diminishing inside and outside diameter which results in a tapering at the bottom of the plug. Also, an elongated oval slot 18 is formed through the wall of the main body portion 12 in at least one position. A collar 20 fits around the main body portion and is sealed therearound by means of an o-ring 21. This collar is slidable along the length of the main body portion and is capable of adjusting the location of the bottom of the elongated slot 18.

The drain opening 30 through the tub bottom 32 extends downward in a tapering fashion to form a tapered flange 36 with a circular opening in the bottom thereof coaxial with an opening 34 in the bottom of the tub. As explained above, the top portion 14 of the plug is slightly flared. The inside flare of the top portion 14 is formed so that it will correspond to, fit around and mate with the exterior of the downwardly extending flange 36 of the tub. With this structure, it is possible to fit the top portion 14 of the plug around the flange 36 to form an extended spout for draining the water from the tub through opening 34. In practice, the plug 10 is moved to a position where the outside surface of the flange 36 engage the inside walls of the top portion 14. Then, the plug is twisted as it is pressed against the flange to create a force pit therebetween. When the top portion 14 of the plug is in position around the flange 36, water which is inside the tub will flow through the opening 34, through the hollw plug (top, main, and bottom portions), and out an opening 38 in the bottom of the plug.

Figure 3:
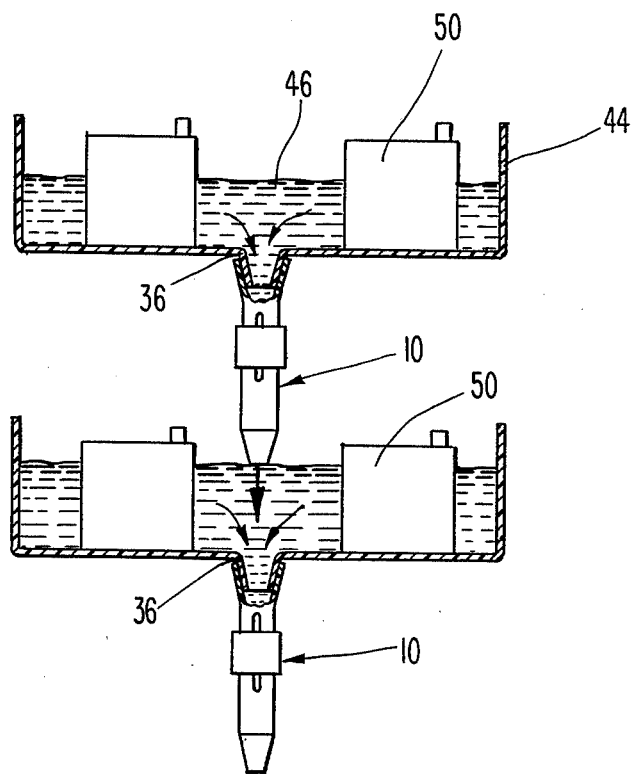
FIG. 3 is a cross-sectional view of two stacked water bath tubs having drain/overflow plugs of the present invention used as drain plugs.

The significance of adapting such a plug for use with the downwardly extending drain flange of the tub is shown in FIG. 3. A tub 44 for holding the batteries 50 being formed has water therein for dissipating the heat produced during formation of the batteries. The water level 46 drains through the opening 34 and plug 10. As can be seen from FIG. 3, the plug extends from the upper tub toward the lower tub and is of sufficient length to extend beneath the top level of the batteries in the lower tub 49. When the plug is in place, the draining water stays within the confines of the plug and does not splash across the top of the batteries, and by being delivered almost to the surface of the water in the next lower tub, a marked decrease in the tendency for the water to splash is also exhibited.

The structural relationship exhibited in FIG. 3 is a preferred embodiment. It is, however, recognized that variations of the various elements will be obvious, such as having the bottom portion of the plug extended to or beneath the water level in the lower tub as opposed to opening above the water surface. All of these positions will help to reduce the splashing of the water of the upper tank as it enters the lower tank.

Figure 2:
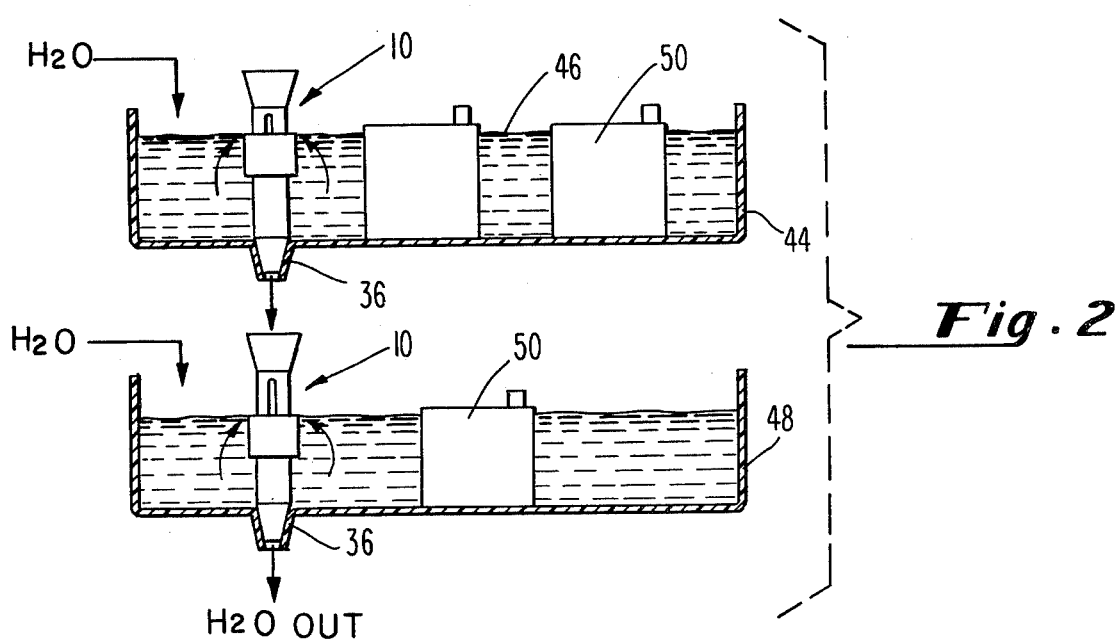
FIG. 2 is a cross-sectional view of two stacked water bath tubs having drain/overflow plugs of the present invention used as overflow plugs.

The second intended use for the drain/overflow plug of this invention is shown in FIG. 2, wherein the bottom portion of the plug is inserted into the drain opening 34 to act as an overflow valve. The tapered lower portion 16 of the cylinder is designed so that the taper will substantially coincide with the inside taper of the drain flange 36. Water or other cooling fluid is added to each tub from a supply source. In order to establish the height of water which is to be maintained in the tub, the slidable collar 20 is positined on the main body portion 12 of the plug at the appropriate position surrounding the elongated slot 18. Thus, the proper water depth in the tub is established since water which would tend to raise the level in the tub passes inside the plug through the elongated slot above the collar and passes out of the tub through the opening 34 in the bottom. As long as the water level remains above the top of the collar, the water will flow through the elongated slot.

As further shown in FIG. 2, by aligning the drain holes of the various stacked tubs and inserting the plug 10 therein, the water which drains from the upper tubs can be caused to drain directly through each of the successively aligned tubs without ever mixing with the water in the lower tubs. Thus, since no mixing of the overflow with the water in the lower tubs takes place, it is possible to maintain the water in all of the tubs at approximately equal temperatures.

It is further considered, though not specifically shown, that two plugs may be fitted to one drain opening at the same time, since the bottom of one plug may fit into the inside of the flange 36 and the top of the second plug may fit around the outside of that same flange 36. For example, when the drain holes of successive tubs are not aligned the upper plug may be used to control the water level within the tub, and the lower tub may be used to direct the overflow water into the next lower tub without allowing it to splash or spray.

Though the plug of this invention may be made of various materials, it is preferred that PVC be used.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in complicance with the Rules of Practice of the United States Patent and Trademark Office, and is not intended to limit the scope of the invention described and claimed herein.

What is claimed is:

1. A combination overflow and drain plug comprising:
    (a) a hollow plug member adapted at one end to fit around the outside of a drain opening and adapted at the opposite end for fitting into said drain opening, said hollow plug further having an elongated slot therein; and
    (b) collar means slidable and sealingly fitted around said plug member for sliding along said plug member and covering said slot in said plug member.

2. A plug as claimed in claim 1, wherein said hollow plug member is comprised of:
(a) a hollow main body portion;
(b) a hollow upper body portion connected to the top of said main body portion and adapted to fit around the outside of said drain opening; and
(c) a hollow lower body portion at the bottom of said main body portion adapted to fit into said drain opening.

3. A plug as claimed in claim 2, wherein:
(a) said main body portion is cylindrical;
(b) said upper body portion expands outwardly from said main body portion and has a circular cross-section; and
(c) said lower body portion tapers inward from the bottom of said main body portion and has a circular cross-section.

4. A plug as claimed in claim 1, wherein said collar means is comprised of:
(a) a collar member slidably fitted around said hollow plug members; and
(b) seal means between said collar member and said hollow plug member for sealing said collar member to said hollow plug member.

5. A plug as claimed in claim 4, wherein said seal means is comprised of an O-ring.

6. An apparatus for controlling the temperature of a plurality of batteries during the formation thereof, said apparatus comprising:
(a) a plurality of vertically stacked tub member means for holding said batteries and a cooling fluid therein, said tub means having a drain opening through the bottom thereof; and
(b) combination plug means for fitting around said drain opening and extending downward therefrom and for fitting into said drain opening, extending upward therefrom and adjustably controlling the fluid level of said cooling fluid in said tub member means.

7. An apparatus as claimed in claim 6, wherein said combination plug means is comprised of:
(a) a hollow plug member adapted at one end to fit around the outside of a drain opening and adapted at the opposite end for fitting into said drain opening, said hollow plug further having an elongated slot therein; and
(b) collar means slidable and sealingly fitted around said plug member for sliding along said plug member and covering said slot in said plug member.

8. An apparatus as claimed in claim 7, wherein said hollow plug member is comprised of:
(a) a hollow main body portion;
(b) a hollow upper body portion connected to the top of said main body portion and adapted to fit around the outside of said drain opening; and
(c) a hollow lower body portion at the bottom of said main body portion adapted to fit into said drain opening.

9. An apparatus as claimed in claim 8, wherein:
(a) said main body portion is cylindrical;
(b) said upper body portion expands outwardly from said main body portion and has a circular cross-section; and
(c) said lower body portion tapers inward from the bottom of said main body portion and has a circular cross-section.

10. An apparatus as claimed in claim 7, wherein said collar means is comprised of:
(a) a collar member slidably fitted around said hollow plug members; and
(b) seal means between said collar member and said hollow plug member for sealing said collar member to said hollow plug member.

11. An apparatus as claimed in claim 10, wherein said seal means is comprised of an o-ring.

* * * * *